(12) United States Patent
Rudolph et al.

(10) Patent No.: US 12,730,188 B2
(45) Date of Patent: Sep. 8, 2026

(54) RADAR INSTALLATION AND CALIBRATION SYSTEMS AND METHODS

(71) Applicant: Teledyne FLIR Commercial Systems, Inc., Goleta, CA (US)

(72) Inventors: Nathan Rudolph, Santa Barbara, CA (US); Nicholas Hogasten, Santa Barbara, CA (US); Travis Frecker, Goleta, CA (US); Louis Tremblay, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 729 days.

(21) Appl. No.: 17/974,375

(22) Filed: Oct. 26, 2022

(65) Prior Publication Data

US 2023/0049866 A1 Feb. 16, 2023

Related U.S. Application Data

(63) Continuation of application No. PCT/US2021/029997, filed on Apr. 29, 2021.

(60) Provisional application No. 63/018,420, filed on Apr. 30, 2020.

(51) Int. Cl.

| | |
|---|---|
| ***G01S 7/40*** | (2006.01) |
| ***G01S 7/24*** | (2006.01) |
| ***G01S 13/66*** | (2006.01) |
| ***G01S 13/86*** | (2006.01) |

(52) U.S. Cl.

CPC .............. *G01S 7/4026* (2013.01); *G01S 7/24* (2013.01); *G01S 7/4091* (2021.05); *G01S 13/66* (2013.01); *G01S 13/86* (2013.01)

(58) Field of Classification Search

CPC ........ G01S 7/4026; G01S 7/4091; G01S 7/24; G01S 13/66; G01S 13/86

See application file for complete search history.

(56) References Cited

U.S. PATENT DOCUMENTS

| | | | | |
|---|---|---|---|---|
| 4,730,104 | A * | 3/1988 | Rogers | G01S 7/06 356/145 |
| 7,633,431 | B1 * | 12/2009 | Wey | G01S 13/95 342/75 |
| 9,865,933 | B2 * | 1/2018 | Scheschko | H01Q 15/18 |
| 2013/0088382 | A1 * | 4/2013 | Lee | G01S 7/4026 342/174 |
| 2013/0154871 | A1 * | 6/2013 | Gaboury | G01S 7/4026 342/82 |

(Continued)

FOREIGN PATENT DOCUMENTS

| | | | |
|---|---|---|---|
| JP | 2021139852 | A * | 9/2021 |
| WO | WO 2014/009937 | A1 | 1/2014 |

*Primary Examiner* — Yuqing Xiao

(74) *Attorney, Agent, or Firm* — Haynes and Boone, LLP

(57) ABSTRACT

Radar installation and calibration systems and methods are provided. In one example, a controller of a radar system receives installation parameters associated with an installation of a radar system. A present orientation of a radar device of the radar system is determined and compared to the installation parameters to determine a deviation of the present orientation from the installation parameters. The deviation is sent to a coordinating device associated with the radar device to cause the deviation to be outputted as installation feedback through the coordinating device. Related systems and methods are also provided.

20 Claims, 6 Drawing Sheets

(56) References Cited

U.S. PATENT DOCUMENTS

| | | | | |
|---|---|---|---|---|
| 2019/0137618 | A1* | 5/2019 | Hawker | G01S 19/45 |
| 2019/0265330 | A1* | 8/2019 | Rajendran | G01S 13/867 |
| 2021/0190908 | A1* | 6/2021 | Mikhailov | B64U 10/14 |
| 2022/0228861 | A1* | 7/2022 | Kondo | G01S 7/4091 |

* cited by examiner

RADAR INSTALLATION AND CALIBRATION SYSTEMS AND METHODS

CROSS-REFERENCE TO RELATED APPLICATIONS

This application is a continuation of International Patent Application No. PCT/US2021/029997 filed Apr. 29, 2021 and entitled "INSTALLATION AND CALIBRATION OF RADAR SYSTEMS," which claims priority to and the benefit of U.S. Provisional Patent Application No. 63/018,420 filed Apr. 30, 2020 and entitled "RADAR INSTALLATION AND CALIBRATION SYSTEMS AND METHODS," all of which are hereby incorporated by reference in their entirety.

TECHNICAL FIELD

One or more embodiments relate generally to radar processing and more particularly, for example, to radar installation and calibration systems and methods.

BACKGROUND

Radar systems are commonly used to detect targets (e.g., objects, geographic features, or other types of targets), such as targets in proximity to watercraft, aircraft, vehicles, or fixed locations. The radar systems may transmit (e.g., broadcast) radar signals and receive return signals. Such return signals may be based on reflections of the transmitted radar signals by targets.

SUMMARY

Various embodiments related to installation of radar systems are disclosed. For example, a radar system may include one or more wireless communication devices and a controller electrically coupled to the one or more wireless communication devices. The controller may receive, via the one or more wireless communication devices, installation parameters associated with an installation of the radar system. The controller may determine a present orientation of a radar device of the radar system. The controller may compare the present orientation of the radar device to the installation parameters to determine a deviation of the present orientation from the installation parameters. The controller may send the deviation to a coordinating device associated with the radar device to cause the deviation to be outputted as installation feedback for a user through the coordinating device.

Various embodiments related to calibration of radar systems are disclosed. For example, a radar system may include a transceiver configured to transmit and receive radio waves; a device configured to provide calibration data; and a controller communicatively coupled to the transceiver and the device. According to some embodiments, the controller may determine, based on radio waves received by the transceiver from a detection area, a first tracked movement parameter of a target at a plurality of locations as the target moves along a calibration movement pattern within the detection area. Based on the calibration data obtained from the device, a second tracked movement parameter may be determined for the target at the plurality of locations as the target moves along the calibration movement pattern within the detection area. The first tracked movement parameter may be correlated to the second tracked movement parameter. The radar system may be calibrated based on the correlation of the first tracked movement parameter to the second tracked movement parameter.

The scope of the invention is defined by the claims, which are incorporated into this section by reference. It will be appreciated that devices, systems, methods, and non-transitory machine-readable mediums may be utilized to perform several of the operations described herein. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
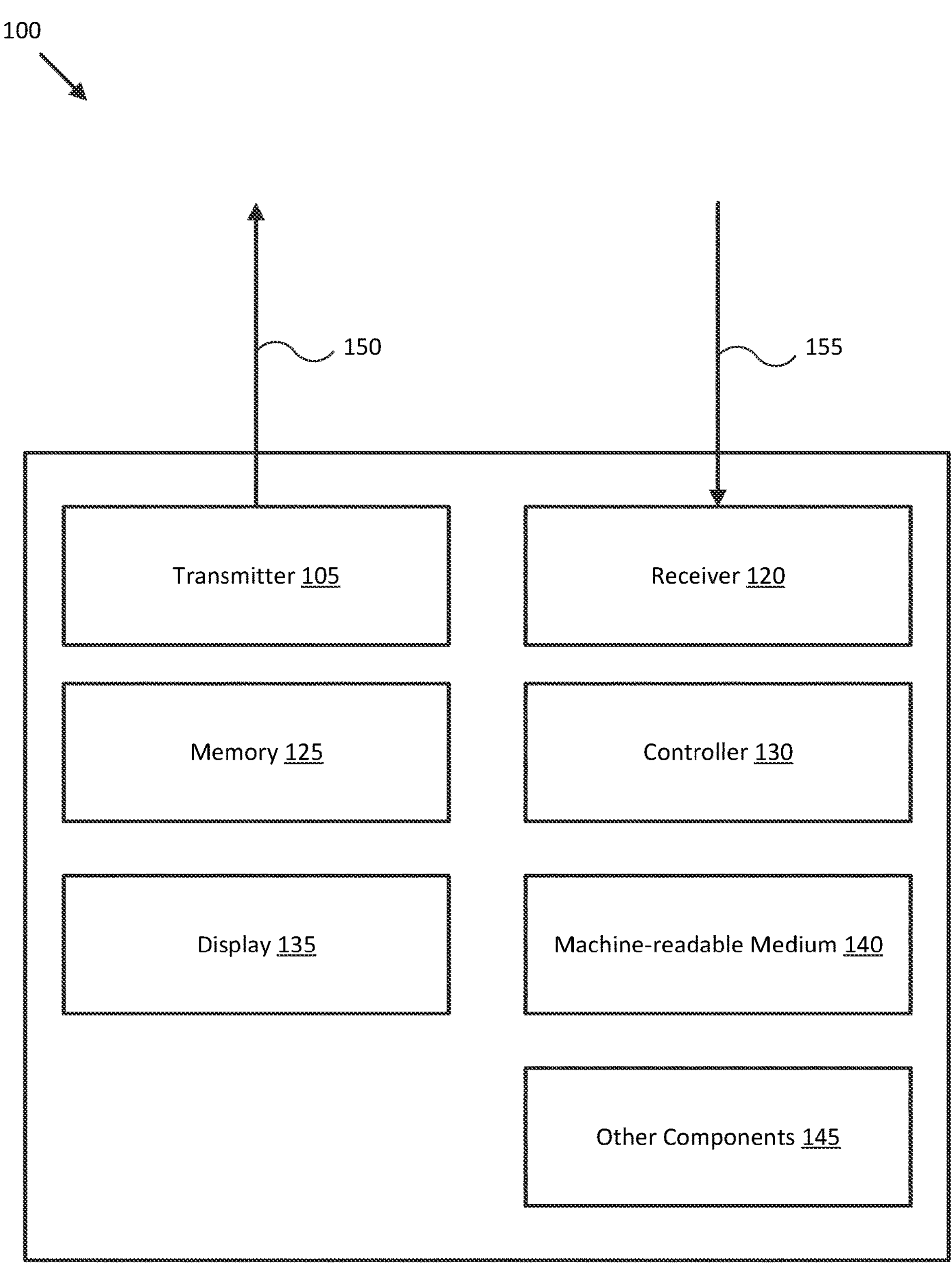
FIG. 1A illustrates a block diagram of an example radar system in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various installation and calibration systems and methods are disclosed for radars. Typically, the ability to detect targets in a specified area is an important consideration when installing a radar device. In some cases, a mounting height for the radar device as well as pan and tilt angles of the radar device may be adjustable to facilitate an installation process of the radar device. For example, the radar device may need to be appropriately mounted and oriented such that the radar device is directed in a desired direction. In some embodiments, various sensors of a radar system (e.g., those installed on the radar device and/or communicatively coupled to the radar device) and/or wireless communication between the radar device and a user device may be utilized/leveraged to assist in mounting the radar device at a desired location and orientation during an installation of the radar device.

As a non-limiting example, a user may be able to visualize and configure a radar tracking zone before installation (e.g., using a software tool) in order to select settings/values for installation parameters for a radar device/application. The settings may include a desired mounting height and a desired angle. Before installation, the settings for the mounting height and angle may be stored in a memory of a radar device. In some cases, the settings may be associated with a network identity of the radar device and pushed to the radar device by a vendor management system (VMS), physical security management system (PSIM), and/or any other system on a network that can detect that the radar device is connected (e.g., to an appropriate system) and ready to receive the installation parameters. In some instances, the radar may be equipped with an inclinometer, compass, altimeter, global positioning system (GPS) chip, and various other sensor devices such that the radar knows and is aware of its current orientation including pointing angles, mounting height, and coordinate position.

In some aspects, the radar may communicate a deviation between a desired installation orientation and a current installation orientation to a user or a user device (e.g., coordinating device associated with the user) for display to the user. A coordinating device may be a feedback device installed in the radar system and/or communicatively coupled to (e.g., via wired and/or wireless communication) the radar system that a user can refer to for feedback during installation. In some cases, the coordinating device may be considered a device separate (e.g., physically separate) from the radar system and communicatively coupled to the radar system. In other cases, the coordinating device may be considered to be part of the radar system.

In one example, the coordinating device may include light-emitting diodes (LEDs) and be disposed (e.g., on the radar system) such that the LEDs are visible to the user during installation of the radar. A controller of the LEDs may activate the LEDs upon receiving a deviation between a current orientation of the radar and a desired orientation of the radar and then illuminate the LEDs in such a way to indicate how the radar needs to be adjusted (e.g., tilted up, down, left, right, etc.) to align the radar with the desired orientation. In this regard, the radar may provide visual feedback for a user during installation. For example, the coordinate device may include seven LEDs, with each LED associated with an identifier (e.g., first LED, second LED, seventh LED, etc.). To indicate that the radar needs to be tilted up, the first LED and the third LED may be activated (e.g., turned on to emit light) and the remaining LEDs may be inactivated (e.g., turned off to not emit light). To indicate that the radar needs to be tilted to the right, the second LED and the third LED may be activated and the remaining LEDs may be inactivated. A mapping between activated (and inactivated) LEDs and how the radar needs to be adjusted may be provided to the user as part of a manual (e.g., printed out manual and/or electronic manual) and/or otherwise provided to the user (e.g., via the radar application). In some cases, LEDs that emit different colors and/or different light intensities may be utilized alternatively or in addition to selecting different ones of the LEDs to activate/inactivate.

In some cases, the radar may provide audible feedback such as audible signals (e.g., from a speaker embedded in the radar, installed on the radar, or otherwise coupled to the radar) via the coordinating device. A controller may have access to preset audio samples that correspond to instructions for remedying deviations encountered during installation. When a particular deviation is determined, the controller may play the corresponding audio sample to instruct a user how to remedy the deviation. For example, an audio output may indicate to "adjust heading angle by rotating counterclockwise by 15 degrees" or "adjust tilt angle by tilting up 30 degrees." Various other devices may be used to provide feedback. For example, a camera coupled to the radar may be used to detect a horizon line to which a tilt angle of the radar may be compared, and feedback for any deviation in the tilt angle may be provided to the user via the coordinating device. Feedback related to the installation deviation may also be reported through various means of communication such as Wi-Fi, Bluetooth, Ethernet, etc. to an application viewable by the user on the user device, such as a mobile device (e.g., cell phone, tablet, etc.) for example.

After installation, and sometimes before installation, radar systems and devices generally require calibration to provide accurate readouts during operation. In an aspect, information related to a mounting location and orientation of a radar may be used to transform (e.g., translate) data from an incoming radar signal received by a radar into a track location on a map. Information such as, by way of non-limiting examples, radar height/distance from a ground or reference level, radar coordinate positions (e.g., latitude, longitude), radar heading angle, and radar tilt angle may provide useful information for calibration purposes. For example, such information may provide a basis for translating range and heading data collected by the radar to a position on a map.

Manual provision of such information may be susceptible to input error, and using single sensors to determine the information may cause additional errors. Calibration should be quick and easy to perform before or after installation such that a radar detection in radar coordinate space can be associated with a position on a map and/or image and a coordinate transfer function (e.g., mapping) can be calculated and stored. The coordinate transfer function may be used for future radar detections such that the detections can be associated with a map or image location. This may assist in displaying radar detection/tracks to users as well as improve accuracy for cases where other sensors on a motion state need to be directed towards the area of detection such as in a hand-off to a pan tilt zoom (PTZ) imager for example.

In an embodiment, a single-user calibration setup for a radar using GPS and Wi-Fi is provided. In some aspects, such a radar may be utilized for short-range radar. In some cases, a short-range radar may include radar for detecting targets within around hundreds of meters. A radar may be GPS-enabled to identify its own GPS coordinate position. In one aspect, a user may have a GPS-enabled device such as a cell phone and a wireless connection to the radar through an application installed on the GPS-enabled device. The user may set up the radar at a final installation location and enter a calibrate mode on the application, which will activate the radar's continuous wave mode operation or pulsed mode operation depending on a particular implementation. In one example, in the continuous wave mode operation, the user may walk along a calibration movement pattern in a detection area of the radar as the radar emits frequency-modulated continuous wave signals. In another example, in the pulsed mode operation, the user may walk along a calibration movement pattern in a detection area of the radar as the radar emits pulsed signals. In either example, the user may walk radially inwards and outwards, directly towards and away from the radar, or in any other fashion suitable for calibration purposes. A continuous GPS tracking of the location (e.g., using GPS coordinates) of the user as the user walks along the calibration movement pattern combined with velocity measurements from the Doppler effect as measured by the radar in continuous wave or pulsed mode may provide information to calibrate the radar. It is noted that when the radar is in pulsed mode, the radar may detect both bearing and range of the target (e.g., the target may be the user in some implementations), which may be compared with known GPS coordinates of the radar and the target to calibrate the radar output.

With regard to the aforementioned embodiment, it is noted that if multiple radar tracks are present, the user may identify and select their own movement pattern track to allow coordinate mapping algorithms to ignore other radar detections of the other radar tracks. Such coordinate mapping algorithms may provide a transfer function of coordinates in a first coordinate space to coordinates in a second coordinate space.

In some embodiments, to increase effectiveness, a user may use a strong radar reflector to provide a known and/or strong radar response at the position of the reflector. For example, the strong radar reflector may be an item that can be held and/or worn by the user, such as a wristband that has a known and/or strong radar response. The user may indicate (e.g., on an application installed on a user device) their position in a geographic coordinate space and assume this position may be easily identified in the radar coordinate space via radar detection, which may allow for coordinate correlation between the geographic coordinate space and radar coordinate space.

In some embodiments, a radar emitter may be utilized, and the radar may be enabled for a receive-only mode. The radar emitter may be time-synced with the radar to avoid receiving signals from other nearby radars. The radar emitter may be limited to a narrow time slot or frequency slot to avoid interference from other sources. The radar emitter may be controlled from the same application used to indicate the radar emitter position (e.g., if the user selects a position on a map/image, the radar emitter may be activated to emit a radar signal). The radar may be configured to acknowledge detection of emitter signals and a detected coordinate corresponding to the detected emitter signal may be shown to a user on a user interface to facilitate proper calibration as the user is in the field. In some cases, the radar emitter may be held by the user and moved within a detection area of the radar or by a device whose position is adjustable (e.g., suspended from a moveable crane and moved within the detection area).

In another embodiment, a calibration technique using multiple sensors is disclosed. In this regard, if an area observed by a radar is also observed by another sensor(s) (e.g., a thermal and/or visible imager), then detected moving objects by the other sensor may be associated to tracked objects in the radar based on the shape of the tracked path.

For example, if an object is moving from East-to-West in the observed scene, it may be determined that the East-to-West moving track in the radar and the East-to-West moving object detected by the imager are the same. If there is sufficient knowledge of the delay in the two systems (e.g., radar and imager), data points (e.g., coordinate data points) from a first track in the radar system may be correlated to data points in a second track in the imager system. This process may be repeated until a sufficient number of data points have been determined across the detection area of the radar such that a mapping can be generated to map coordinate positions in the radar coordinate space to coordinate positions in the other sensor's (e.g., the imager's) coordinate space. The number of data points considered to be sufficient may be based on application (e.g., required precision, expected size of targets, etc.). It is noted that a coordinated space may be a space in which an ordered list of coordinates, each from a set (not necessarily the same set), collectively determine an element (or point) of the space (e.g., a space with a coordinate system). Generally, sensors (e.g., radar, imager, etc.) may have a coordinate system for identifying points in a coordinate space relative to the sensor. For example, a radar coordinate space may have a coordinate system for identifying points in a radar space. As another example, an imager coordinate space may have a coordinate system for identifying points in an image space. For example, a lower-left corner of an image captured by an imager may be designated as a coordinate point (0, 0) in the imager coordinate space.

Referring now to the drawings, FIG. 1A illustrates a block diagram of a radar system 100 in accordance with one or more embodiments of the present disclosure. Variations in the arrangement and type of the components may be made without departing from the spirit or scope of the claims as set forth herein. Additional components, different components, and/or fewer components may be provided. In various embodiments, the radar system 100 may be configured for use on watercraft, aircraft, vehicles, construction machinery (e.g., cranes), fixed locations such as buildings, or other environments, and may be used for various applications such as, for example, leisure, commercial, military navigation and/or security. Other types of navigation and/or security and additional applications are also contemplated. In one aspect, the radar system 100 may be implemented as a relatively compact portable unit that may be conveniently installed by a user. As some examples, the radar system 100 may be installed in a mobile device, on a building or other physical structure, and on a vehicle.

The radar system 100 includes a transmitter circuitry 105, a receiver circuitry 120, a memory 125, controller 130, a display 135, a machine-readable medium 140, and other components 145. In an aspect, a radar device may include the transmitter circuitry 105 and the receiver circuitry 120. In some cases, the radar device may include other components shown in FIG. 1A, such as the memory 125 and/or the controller 130. The transmitter circuitry 105 includes one or more transmit (TX) antenna elements and appropriate circuitry to generate radar signals and provide such radar signals to the TX antenna elements, such that these radar signals can be transmitted by the TX antenna elements. Such transmitted radar signals are denoted as signals 150 of FIG. 1A. The transmitter circuitry 105 may include a waveform generator that generates various waveforms to be utilized as radar signals. Such waveforms may include pulses of various lengths (e.g., different pulse widths), frequency-modulated continuous-wave (FMCW) signals, and/or other waveforms appropriate for radar applications. FMCW signals may be implemented, for example, as rising, falling, or rising/falling frequency sweeps (e.g., upchirps, downchirps, or up/down chirps). The transmitter circuitry 105 may include one or more power amplifiers that receive the radar signals from the waveform generator and drive the radar signals on the TX antenna element(s) of the transmitter circuitry 105. In some cases, characteristics of the radar signals may be based at least in part from control signals received by the controller 130.

The receiver circuitry 120 may include one or more receive (RX) antenna elements (e.g., phased array antennas) and circuitry to process radar signals received by the RX antenna elements. Such received radar signals are denoted as signals 155 in FIG. 1A. The RX antenna elements can receive the radar signals 155, which may be reflections of the transmitted radar signals 150 from targets/objects in a scene or detection area or radar signals emitted directly from the targets/objects. In some cases, received radar signals 155 that were reflected from a target/object may be referred to as received return signals. The receiver circuitry 120 may include appropriate circuitry to process these received signals. The receiver circuitry 120 may include one or more low-noise amplifiers (LNAs) for amplifying the received radar signals 155. The receiver circuitry 120 may include a demodulator to receive the radar signals 155 and convert the received radar signals 155 to baseband. In some cases, the demodulator may generate I signals and Q signals based on the received radar signals 155. The receiver circuitry 120 may include filters (e.g., low-pass filters) to be applied to the radar signals (e.g., baseband radar signals). The receiver circuitry 120 may include an analog-to-digital (ADC) circuit to convert the received radar signals 155, or filtered versions thereof, which are analog signals, to digital radar signals. The digital radar signals may be provided to the controller 130 for further processing to facilitate radar applications (e.g., target detection applications).

The controller 130 may be implemented as any appropriate processing device (e.g., microcontroller, processor, application specific integrated circuit (ASIC), logic device, field-programmable gate array (FPGA), circuit, or other device) that may be used by the radar system 100 to execute appropriate instructions, such as non-transitory machine readable instructions (e.g., software) stored on the machine-readable medium 140 and loaded into the memory 125. For example, on an RX side, the controller 130 may be configured to receive and process radar data received by the receiver circuitry 120, store the radar data, processed radar data, and/or other data associated with the radar data in the memory 125, and provide the radar data, processed radar data, and/or other data associated with the radar data for processing, storage, and/or display. In this example, outputs of the controller 130 may be, or may be derived into, representations of processed radar data that can be displayed by the display 135 for presentation to one or more users. On a TX side, the controller 130 may generate radar signals or associated signals to cause radar signals to be generated and fed to the transmitter circuitry 105, such that these radar signals can be transmitted by the TX antenna element(s) of the transmitter circuitry 105. In an embodiment, the controller 130 may be utilized to process radar return data (e.g., perform fast Fourier Transforms (FFTs), perform detection processing on FFT outputs) received via the receiver circuitry 120, generate target data, perform mitigation actions or cause performing of mitigation actions if appropriate in response to the target data, and/or other operations.

The memory 125 includes, in one embodiment, one or more memory devices configured to store data and information, including radar data. The memory 125 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the controller 130 may be configured to execute software instructions stored in the memory 125 so as to perform method and process steps and/or operations. The controller 130 may be configured to store in the memory 125 data such as, by way of non-limiting example, filter coefficients, beamforming coefficients, and object/target detection data.

The display 135 may be used to present radar data, images, or information received or processed by the radar system 100. In one embodiment, the display 135 may be a multifunction display with a touchscreen configured to receive user inputs to control the radar system 100.

The radar system 100 may include various other components 145 that may be used to implement other features such as, for example, sensors, actuators, communications modules/nodes, other user controls, communication with other devices, additional and/or other user interface devices, and/or other components. In some embodiments, other components 145 may include a humidity sensor, a wind and/or water temperature sensor, a barometer, a visible spectrum camera, an infrared camera, a compass, an altimeter, a GPS tracking device and/or other sensors and devices providing measurements and/or other sensor signals that can be displayed to a user and/or used by other devices of radar system 100 to provide operational control of the radar system 100 such as for installation and calibration purposes described herein. For example, such sensor signals may be utilized to compensate for environmental conditions, such as wind speed and/or direction; swell speed, amplitude, and/or direction; and/or an object in a path (e.g., line of sight) of the radar system 100. Imagers (e.g., visible spectrum camera, infrared camera) may be utilized to provide situational awareness of a scene, such as by providing image data associated with captured radar data. Further, the images may provide calibration information that may be used in a calibration process described herein. In some cases, sensor information can be used to correct for movement (e.g., changes in position, orientation, and/or speed) associated with the radar system 100 between beam emissions to provide improved alignment of corresponding radar returns/samples, for example, and/or to generate imagery based on the measured orientations and/or positions of the radar system 100 assembly/antennas. In some cases, an external orientation and/or position sensor can be used alone or in combination with an integrated sensor or sensors. In some cases, alternatively or in addition to having sensors and/or other devices as part of the radar system 100, the sensors and/or other devices may be collocated with the radar system 100. Such sensors and/or other devices may provide data to the radar system 100 (e.g., via wired and/or wireless communication).

In some cases, the radar system 100 may include one or more visible spectrum cameras and/or one or more infrared cameras, such as to capture image data of a scene scanned by the radar system 100. In one embodiment, the other components 145 includes a communication interface that may communicate with another device that may be implemented with some or all of the features of the radar system 100. Such communication may be performed through appropriate wired or wireless signals (e.g., Wi-Fi, Bluetooth, or other standardized or proprietary wireless communication techniques). In one example, the radar system 100 may be located at a first position (e.g., on a bridge of a watercraft in one embodiment) and may communicate with a personal electronic device (e.g., a cell phone, tablet, computer, etc.)

located at a second position (e.g., co-located with a user on another location on the watercraft). In this regard, the user's personal electronic device may receive radar data and/or other information from the radar system 100. As a result, the user may conveniently receive relevant information (e.g., radar images, alerts, notifications, installation feedback, calibration information, or other information) even while not in proximity to the radar system 100. Information related to installation and calibration techniques presented in the disclosure may be provided for display to the user for example. In an implementation, the user may have an application installed on a user device which may receive real time installation feedback as the user is installing the radar system 100 and present such feedback to the user on a display of the user interface to assist the user in installing the radar system 100. Since the user device may be used to help coordinate installation of the radar system 100, the user device may be referred to as a coordinating user device or simply a coordinating device. In an implementation, the application may provide calibration user interface to allow the user to proceed through instructed steps to calibrate the radar system 100.

In further examples, the radar system 100 may include one or more LEDs, such as to provide feedback to a user during an installation of the radar system 100. In yet further examples, the radar system 100 may include one or more speakers communicatively coupled to the controller 130 and configured to provide audible feedback to the user during the installation of the radar system 100.

Figure 1B:
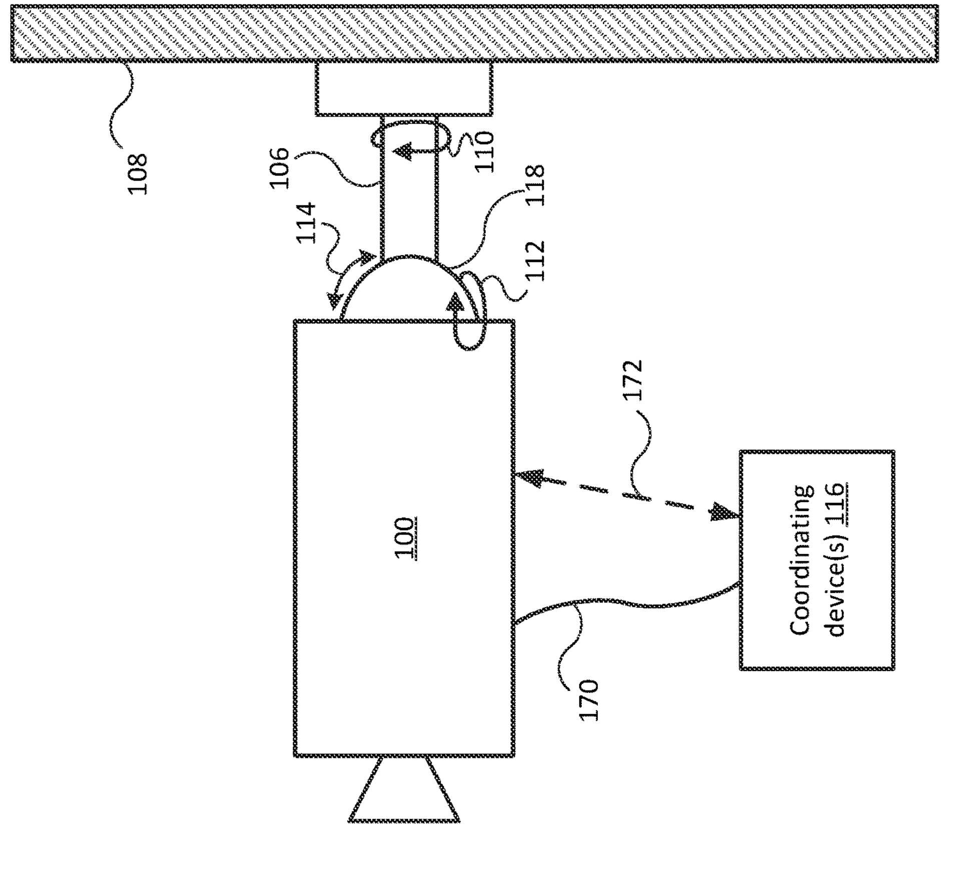
FIG. 1B illustrates an example environment in which the radar system of FIG. 1A may be operated in accordance with one or more embodiments of the present disclosure.

FIG. 1B illustrates an example environment 101 in which the radar system 100 may be operated. The example environment 101 includes the radar system 100 and coordinating device(s) 116. In the illustrated embodiment of FIG. 1B, the radar system 100 and the coordinating device 116 may communicate with each other over a wired connection 170 and/or a wireless connection 172 to perform various operations for automatic and/or manual installation and/or calibration as discussed herein. In some embodiments, the coordinating device 116 may be implemented in the radar system 100 to perform various operations for automatic and/or manual installation and/or calibration as discussed herein. In some cases, the coordinating device 116 may include LED devices, speakers, imagers, or a combination of devices, all of which individually, or in combination, may provide various forms of feedback to a user. For example, LED devices may provide visual feedback and speakers may provide audible feedback. In some instances, the coordinating device 116 may be a mobile user device that has a screen display and is capable of receiving installation feedback from the radar system 100 to display for the user as another form of visual feedback. The user device may also have speakers capable of providing audio instructions based on installation feedback.

As shown, the radar system 100 can be securely attached (e.g., fixed) to a structure 108 (e.g., a wall, ceiling, pole, vehicle or other structure appropriate for installing the radar system 100 for purposes such as navigation and/or surveillance) via a mount 106 to monitor and/or track objects within a scene (e.g., scene 104). The mount 106 in some embodiments may be adjustable to rotate or pivot the radar system 100 or devices thereof to adjust for a roll 110, a heading angle 112 (e.g., for panning), and/or a tilt angle 114. The adjustments provided by the mount 106 in these embodiments may facilitate installation of the radar system 100 on a variety of mounting points (e.g., including a corner of a room) at desired heading and/or tilt angles at an appropriate height. In one or more specific examples, the adjustable mount 106 may include a rotatable joint 118 (e.g., a ball joint) that allows rotation or pivoting in directions 110, 112, and/or 114.

A target 123 in the scene 104 within a detection area of the radar system 100 may be used in installation and calibration techniques further described below. In some cases, a radar emitter 127 may be installed on the target 123 or held by a user if the target 123 is a user. In further cases, the coordinating device 116 may include the radar emitter 127 such that the radar emitter 127 and the radar system 100 may sync radar signal transmission/receipt via the wireless connection 172.

Figure 2A:
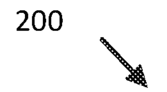
FIG. 2A illustrates a flow diagram of an example process for installing a radar system in accordance with one or more embodiments of the present disclosure.
Figure 2A:
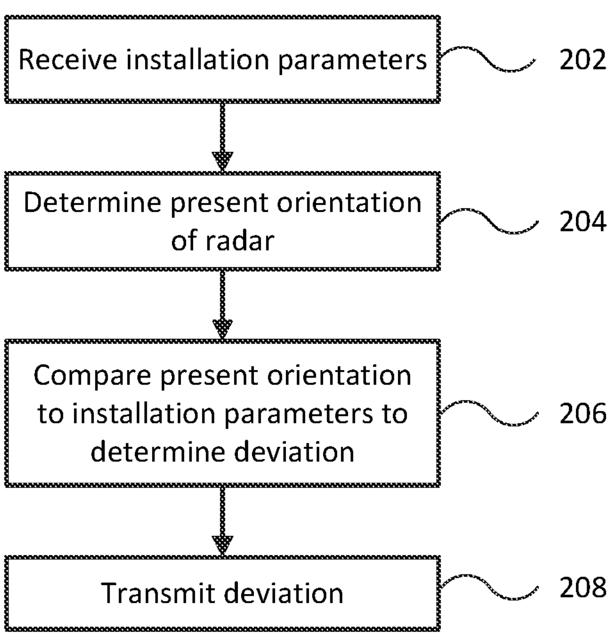

FIG. 2A illustrates an example process 200 for installing a radar system in accordance with an embodiment of the present disclosure. The process 200 may be performed using the controller 130 of the radar system 100 for example. It should be appreciated that any step, sub-step, sub-process, or block of process 200 may be performed in an order or arrangement different from the embodiments illustrated by FIG. 2A. In other embodiments, one or more blocks may be omitted from or added to the process 200. For illustrative purposes, the process 200 is described with reference to FIGS. 1A and 1B but the following description of the process 200 is not limited to FIGS. 1A and 1B.

At block 202, installation parameters are received. For example, a radar system 100 (e.g., controller 130) may receive, via one or more communication devices (e.g., wired and/or wireless communication devices) installed in or coupled to the radar system 100, installation parameters associated with an installation of the radar system 100. In some embodiments, the installation parameters may include a desired tilt angle (e.g., rotation in a vertical plane), a desired heading angle (e.g., rotation in a horizontal plane), a desired mounting height from a ground level or other designated reference level, and/or a desired coordinate position (e.g., geographic coordinates such as latitude, longitude, and elevation) of a radar device of the radar system 100. In some instances, the radar device may be part of, may include, or may be the radar system 100. In an embodiment, the tilt angle may be relative to a horizon line that is detectable by a camera of the radar system 100. In some cases, the tilt angle may be relative to a direction of gravity.

At block 204, a present orientation of the radar device is determined. A present orientation may include a present tilt angle, a present heading angle, a present mounting height, and/or a present coordinate position. For example, an installation of the radar system 100 may be in-progress when the radar system 100 determines the present orientation of its radar device. In one or more embodiments, the radar system 100 may determine the present orientation using an inclinometer, compass, gyroscope, altimeter, and/or GPS module installed in the radar system 100. For example, the controller 130 may communicate with devices/modules of the radar system 100, such as those above, via a bus or wireless communications to gather information related to the present orientation of the radar device.

In an embodiment, the controller 130 may obtain the present tilt angle from the inclinometer where the present tilt angle may be a measured angle of the radar device with respect to a direction of gravity. In a further embodiment, the controller 130 may obtain the present tilt angle from the inclinometer where the present tilt angle may be a measured angle of the radar device with respect to a horizon line detected by an imager or camera of the radar system 100.

"By way of non-limiting examples, the controller 130 may obtain the present heading angle (e.g., using a compass), the present mounting height (e.g., using an altimeter), and/or the present coordinate position (e.g., using a GPS module/chip/device).". In various embodiments, the present tilt angle, heading angle, mounting height, and coordinate position each may be determined using a combination of devices of the radar system 100 or different devices than those specified above in some embodiments.

At block 206, the present orientation may be compared to the installation parameters to determine a deviation. For example, the present tilt angle may be compared against the desired tilt angle to determine a deviation between the present tilt angle and the desired tilt angle. As another example, the present heading angle may be compared against the desired heading angle to determine a deviation between the present heading angle and the desired heading angle. As another example, the present mounting height may be compared against the desired mounting height to determine a deviation between the present mounting height and the desired mounting height. In yet a further example, the present coordinate position may be compared against a desired coordinate position to determine a deviation between the present coordinate position and the desired coordinate position.

In an embodiment, a camera of the radar system 100 may be used by the controller 130 to detect a horizon line. Based on the detected horizon line, the controller 130 may determine a present tilt angle of the radar system 100 and compare the present tilt angle against a desired tilt angle of the installation parameters to determine a deviation with respect to the horizon line.

At block 208, the deviation is transmitted. For example, the deviation may be transmitted from the radar system 100 to a user device associated with a user installing the radar system 100 or the coordinating device 116 associated with the radar system 100. Thus, the user may be able to view the deviation and use such as feedback to align the radar system 100 with the installation parameters. In a further example, the deviation may be transmitted to a mobile user device, which may be the coordinating device 116, via Wi-Fi, Bluetooth, or other network communication protocol for display to a user. The user device's display may provide instructions to the user regarding adjustments to be made to the radar system 100 to align the radar system 100 with the installation parameters. As the user adjusts the radar system 100, the to radar system may continuously compare its present orientation to the desired orientation of the installation parameters. Dynamic updates of any deviation and further instructions may be transmitted to the user device as feedback (e.g., close to instantaneous feedback) during an installation process.

In some embodiments, the radar system 100 may provide visual feedback for a user during installation. As an example, the radar system 100 may transmit the deviation to the coordinating device 116 which may include LEDs visible to the user installing the radar system 100. For example, the LEDs may be disposed on an exterior of the radar system 100 to increase visibility for the user during installation. The LEDs may indicate if the radar system 100 needs to be tilted up, down, left, right, etc. based on the deviation and the present orientation to align the radar system 100 with the desired orientation of the installation parameters. For example, controller 130 may send the deviation as instruction to the LEDs which may illuminate the LEDs in such a way to indicate how the radar needs to be tilted up, down, left, right, etc. or otherwise adjusted to align the radar with the desired orientation. In this regard, the radar may provide visual feedback for a user during installation. Alternatively, or in addition, in some embodiments, the radar system 100 may provide audible feedback, such as audible signals from the coordinating device 116 (e.g., the coordinating device 116 may be a speaker embedded in the radar system 100 or otherwise installed on the radar system 100 and configured to receive instructions from the controller 130). For example, controller 130 may have access to preset audio samples that correspond to instructions for remedying deviations encountered during installation. When a particular deviation is determined, the controller may play a corresponding audio sample to instruct a user how to remedy the deviation. For example, an audio sample may provide "adjust heading angle by rotating counterclockwise by 15 degrees" or "adjust tilt angle by tilting up 30 degrees."

In some embodiments, the coordinating device 116 may be, or may include, an electromechanical adjustment device installed in the radar system 100 and configured to receive instructions, e.g., from the controller 130 or a user device, to adjust the radar device. In this regard, the coordinating device 116 may include various components configured to electromechanically adjust the radar device to align the radar device in the desired orientation. Thus, in an example use case, the radar system 100 may be able to receive installation parameters, determine a present orientation, and compare the present orientation to installation parameters to determine a deviation according to the steps described above. Then the radar device may be able to automatically adjust the radar device to align the radar device in the desired orientation using deviations that are continuously determined based on comparisons of the present orientation to the desired orientation of the installation parameters. Automated adjustment of the radar device may allow for new desired orientations to be pushed to the radar system 100 to align the radar device in the new desired orientations without manual adjustments by a user.

Figure 1B:
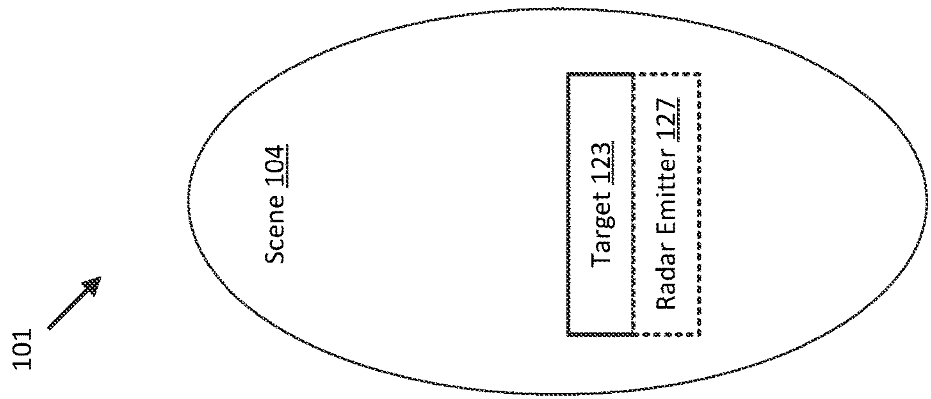
Figure 2B:
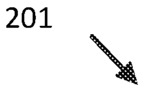
FIG. 2B illustrates a flow diagram of an example process for installing a radar system in accordance with one or more embodiments of the present disclosure.
Figure 2B:
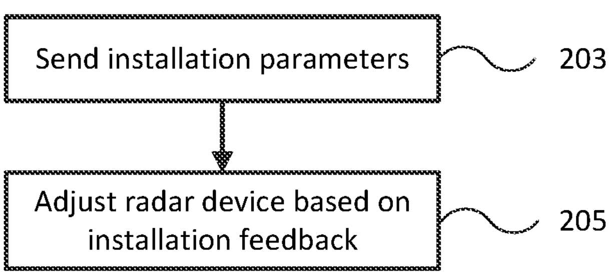

FIG. 2B illustrates an example process 201 for installing the radar system 100 in accordance with an embodiment of the present disclosure. It should be appreciated that any step, sub-step, sub-process, or block of the process 201 may be performed in an order or arrangement different from the embodiments illustrated by FIG. 2B. In other embodiments, one or more blocks may be omitted from or added to the process. For illustrative purposes, the process 201 is described in reference to FIGS. 1 and 2A but the process 201 is not limited to such figures.

At block 203, installation parameters are sent to the radar system 100. For example, a user may input installation parameters to a user device and the user device may send via wire or wireless connection the installation parameters to the radar system 100. The radar system 100 may receive the installation parameters according to process 200 described above. At block 205, the user may adjust (e.g., manually adjust) the radar device of the radar system 100 based on the installation feedback provided by a coordinating device. The coordinating device may include LEDs (e.g., to provide visual feedback), speakers (e.g., to provide audible feedback), user interface of application installed on user device (e.g., to provide visual feedback and/or audible feedback), and/or other component to facilitate coordinating installation of the radar system 100.

Figure 3A:
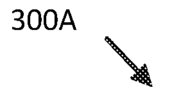
FIG. 3A illustrates a flow diagram of an example process for calibrating a radar system in accordance with one or more embodiments of the present disclosure.
Figure 3A:
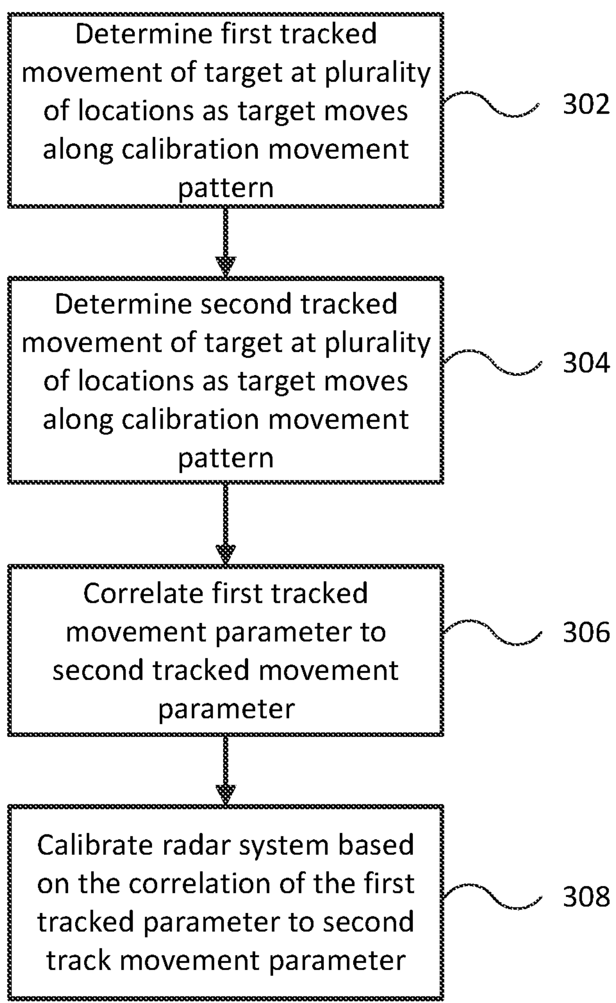

FIG. 3A illustrates an example process 300A for calibrating the radar system 100 in accordance with an embodiment of the present disclosure. The process 300A may be performed using the controller 130 of the radar system 100 for example. In other examples, the process 300A may be performed by a user device communicatively coupled to the radar system 100. In some implementations, one or some of the steps of process may be performed by the controller 130 while other steps are performed by the user device associated with the radar system 100, and vice versa. It should be appreciated that any step, sub-step, sub-process, or block of the process 300A may be performed in an order or arrangement different from the embodiments illustrated by FIG. 3A. For example, in other embodiments, one or more blocks may be omitted from or added to the process 300A. For illustrative purposes, the process 300A is described in reference to FIGS. 1, 2A, and 2B but the following description of the process 300A is not limited to such figures.

At block 302, a first tracked movement parameter of a target at a plurality of locations is determined as the target moves along a calibration movement pattern. For example, the target may be a mobile object utilized for calibration purposes. In other examples, the target may be a user physically moving through the calibration movement pattern. The calibration movement pattern may be a predetermined path, route, etc. within a detection area/scene of the radar system 100 in some embodiments. In other embodiments, the calibration movement pattern may be an arbitrary or random movement pattern within the detection area/scene. Each of the plurality of locations may correspond to a location along the movement pattern. In some cases, each location may be assigned by a calibration application installed on the user device. The calibration application may cause instructions to be displayed on the user device. These instructions may indicate to the user to move along the movement pattern (e.g., from location to location) to calibrate the radar system 100. In other cases, the user may move about the calibration movement pattern and use the calibration application to indicate locations on a user-generated calibration movement pattern. For example, at each location, the user may activate a button in the calibration application that would indicate that the user's (e.g., user device held by the user) current GPS position is a location of a current calibration movement pattern being created by the user.

As an illustrative example use case, a user may install the radar system 100 in a location (e.g., a fixed location). The user may activate a calibration application installed on the user device. The calibration application may allow the user to enter a calibration mode for the radar system 100. The radar system 100 may switch to a pulse mode or continuous wave mode depending on implementation for the calibration. As the radar device of the radar system 100 transmits radar signals, the user may be walking along a calibration movement pattern to reach locations of the calibration movement pattern. For example, according to the calibration movement pattern, the user may walk through the detection area radially inwards/outwards and/or directly towards/away from the radar device. Continuous GPS locations of the user device identified for each of the locations combined with velocity measurement of the user from the Doppler effect as measured by the radar device in continuous wave mode or pulse mode may provide sufficient information to calibrate the radar device as further described below.

Referring back to block 302, the first tracked movement parameter may be a velocity of the target at the plurality of locations as the target moves along the calibration movement pattern within the detection area. For example, the velocity at each of the locations may be determined by using the Doppler effect and measuring reflected radar signals returned from the target at each of the locations and received by a receiver of the radar system 100. Based on a change in frequency of the reflected signal and the originally transmitted signal, a velocity of the target may be determined. The velocity may be used to identify the target's position in radar coordinate space according to some embodiments.

In some embodiments, the first tracked movement parameter may be a distance of the target relative to the radar system 100. For example, based on transmitted radar signals by the radar system 100 that are reflected from the target and received by the radar system 100, a distance of the target relative to the radar system 100 may be determined. In some cases, the distance or range may be calculated based on a time between sending a radar signal and receiving a reflected signal, and a speed of light.

According to some implementations, the target may be equipped with (e.g., hold or wear) a reflector that provides a known and/or strong radar response (e.g., reflection) as the target moves along the movement pattern A user can indicate (e.g., on an application on a user device) the target's coordinate position (e.g., their position if they are moving along the calibration movement pattern) and the target's coordinate position may be mapped into the radar coordinate space by the radar device.

According to additional implementations, the target may be equipped with a radar emitter and the radar system 100 may be in a receive-only mode. The radar emitter may be time-synced with the radar system 100 to avoid receiving signals from other nearby radars. The radar emitter may be limited to a narrow time slot or frequency slot to avoid being confused with other sources. In some cases, the radar emitter may be controlled from the same application used to indicate the target and radar emitter's position. For example, if the user selects a position on a map/image where the target is (e.g., where the user is if the user is holding the radar emitter and moving along the calibration pattern), then the radar emitter will emit a signal from the selected position to the radar device. The radar device may receive the radar signal from the radar emitter, and from the received radar signal may be able to determine the radar emitter's coordinates in radar coordinate space. For example, the radar emitter and radar device may be time-synced such that the radar device knows when the radar emitter has transmitted a signal to the radar device, and based on the transmitted signal received by the radar device, the radar device may determine a distance of the radar emitter relative to the radar device and/or a velocity of the radar emitter (e.g., target to which radar emitter is fastened, attached, held, etc.).

In some cases, the radar system 100 may be configured to acknowledge detection of the radar emitter signal and the detected coordinate may be shown to the user on a user interface. The user interface may allow the user to move along the calibration movement pattern, select locations along the movement pattern in a user interface on a user device in possession of the user, and cause transmission of radar emitter signals to conveniently calibrate the radar system 100.

At block 304, a second tracked movement parameter of the target is determined for the plurality of locations as the target moves along the calibration movement pattern.

For example, in an embodiment, the radar system 100 may receive GPS locations of the target corresponding to the plurality of locations of the target as the target moves along the calibration movement pattern within the detection area. In such a case, the GPS locations may be included in the second tracked movement parameter. The GPS locations may be communicated to the radar system 100 from a user device as the target moves along the calibration movement pattern. In some cases, the GPS locations may be provided to the radar system 100 after the target has moved through the calibration movement pattern. By way of non-limiting example, the user device may be capable of identifying its GPS location. The user may move along the calibration movement pattern within the detection area and the GPS location of the user device may be tracked at each of the plurality of locations (e.g., continuously or periodically such as every 100 ms). In some instances, a user does not move along the calibration movement pattern but rather a mobile device (e.g., automobile device) having a GPS enabled module may move along the calibration movement pattern and transmit and/or save its GPS location at each of the locations along the movement pattern to be provided to the radar system 100 or devices associated with the radar system 100 in real-time or at a later time.

Although reference is made to GPS locations, it will be appreciated that any coordinate system and any positioning system used to identify a location relative to the radar system 100 may be used.

In another implementation example, the radar system 100 may determine the second tracked movement parameter of the target at the plurality of locations as the target moves along the calibration movement pattern within the detection area based on image frames captured by an imager associated with the radar system 100. The imager may be part of the radar system 100 and/or coupled to the radar system 100. The imager may be a thermal imager or visible-light imager for example. In some implementations, as the target moves along the calibration movement pattern within the detection area, the imager may capture images frames of the detection area and the target at the plurality of locations of the calibration movement pattern. The image frames and associated data may be recorded/stored by the imager and provided to the radar system 100. In some cases, the imager may store the image frames in the memory 125 or the machine-readable medium 140. In some cases, the imager may be separate from the radar system 100, and the imager may provide the radar system 100 or associated devices the captured image frames via one or more network connections discussed in the disclosure.

Various other sensor devices other than an imager and GPS communication module may be used to determine the second tracked movement parameter in additional embodiments.

At block 306, the first tracked movement parameter may be correlated to the second tracked movement parameter. For example, correlating the first tracked movement parameter to the second tracked movement parameter may include identifying a change in the first tracked movement parameter and identifying a change in the second tracked movement parameter that corresponds to the change of the first tracked movement parameter.

For example, in an embodiment where the first tracked movement parameter includes velocity data of the target at the plurality of locations of the calibration movement pattern and the second tracked movement parameter includes GPS location data of the target at the plurality of locations, the data from the first tracked movement parameter may be correlated to the data of the second tracked movement parameter. This may also be referred to as correlating the data from the first tracked movement parameter to a mapping of the second tracked movement parameter in some embodiments. A correlation mapping allows for coordinates in a first coordinate space corresponding to the first tracked movement parameter to be translated into a second coordinate space corresponding to the second tracked movement parameter. The second coordinate space may be more easily translatable into a viewable representation. For example, radar coordinate space coordinates translated into geographic coordinate space allows for a user to easily interpret a position of tracked targets.

In another example embodiment where the first tracked movement parameter includes a track (e.g., position relative to the radar system, velocity, etc.) of the target and the second tracked movement parameter includes visible-light image data from image frames captured by an imager associated with the radar system, the track of the first movement may be correlated to the image frames. For example, where the delay between the radar system 100 and the imager is known, data from the first movement track may be correlated to the second movement track from the imager.

The operations performed at block 306 may be repeated until a sufficient number of data points have been found within the detection area of the radar that are desired to be correlated with coordinate spaces of the imager.

At block 308, the radar system 100 is calibrated based on the correlation of the first tracked movement parameter to the second tracked movement parameter. For example, a mapping may be stored for the radar system 100 and utilized to associate future radar detections in radar coordinate space with a position on a map or image (e.g., another coordinate space).

Figure 3B:
FIG. 3B illustrates a flow diagram of an example process for calibrating a radar system in accordance with one or more embodiments of the present disclosure.
Figure 3B:
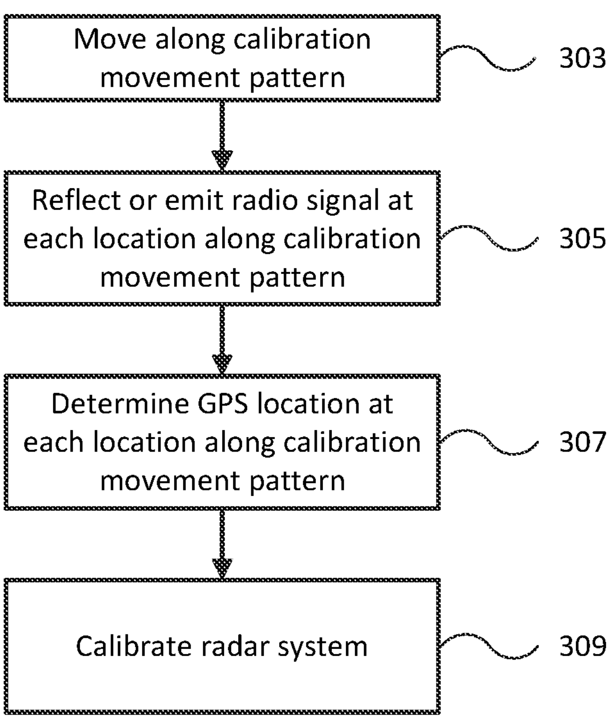

FIG. 3B illustrates an example process 300B for calibrating a radar system 100 in accordance with an embodiment of the present disclosure. It should be appreciated that any step, sub-step, sub-process, or block of process 300B may be performed in an order or arrangement different from the embodiments illustrated by FIG. 3B. In other embodiments, one or more blocks may be omitted from or added to the process 300B. For illustrative purposes, the process 300B is described in reference to FIGS. 1 and 3A but process the 300B is not limited to such figures.

Before block 303, a user may have installed a radar device of the radar system 100 in a fixed location. The user may activate a calibration mode of the radar device by selecting the calibration mode of an application installed on a user device associated with the user. In some instances, the calibration mode may cause the radar device to switch to a continuous wave mode or a pulsed mode. At block 303, the user may physically move along a calibration movement pattern within a detection area of the radar device and any other sensors of the radar system 100.

At block 305, at each of a plurality of locations along the calibration movement pattern, the user may reflect radio waves transmitted by the radar device back to the radar device. In some instances, the user may use a radar emitter of the user device or associated with the user device to transmit radio signals to the radar device which may be operating in a read-only mode during calibration to receive the emitted radar signals. As discussed above with reference to the process 300A, the radar system 100 may determine a velocity and radar coordinate position of the user based on the radio signals reflected and returned from the user. In some cases, the radar system 100 may determine a velocity and radar coordinate position of the user based on emitted radio signals emitted by a user device held by the user, and received at the radar device.

At block 307, GPS locations of the user at each of the plurality of locations along the calibration movement pattern are determined. For example, the user device may have a GPS-enabled module that is capable of determining the GPS location of the user device, and consequently the user holding the user device at each of the locations. The GPS locations of the user may be determined concurrently with when reflected radio signals or emitted radio signals are received by the radar device. Thus, the radar device may be able to correlate the data points of a radar coordinate space to a geographical position coordinate space (e.g., image, map) associated with the GPS locations.

At block 309, the radar system is calibrated based on the radar coordinate positions and the GPS locations of the user. For example, a coordinate transfer mapping may be generated to correlate the radar coordinate positions to coordinate positions on an image based on the reflected radio waves and GPS locations for each of the plurality of locations in the calibration movement pattern. The radar system 100 may use the generated mapping in future radar detections to transfer detected objects from a radar coordinate position to a coordinate position on an image or map in a user interface associated with the radar system 100.

In various embodiments, the user may be replaced with an automated machine that travels along the calibration movement pattern and performs the steps described in the disclosure. The machine may be equipped with GPS-enabled devices radar emitters and various other sensors required to move along the calibration movement pattern and perform the steps described in the disclosure.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A radar system comprising:

a radar device;

a communication device; and a controller electrically coupled to the radar device and the communication device and configured to:

receive, via the communication device, installation parameters associated with an installation of the radar system;

determine a present orientation of the radar device;

compare the present orientation of the radar device to the installation parameters to determine a deviation of the present orientation from the installation parameters; and send the deviation via wireless communication through the communication device to a coordinating device associated with the radar device to cause the deviation to be provided, via the coordinating device, as feedback for facilitating installation of the radar device.

2. The radar system of claim 1, wherein the coordinating device comprises a light-emitting diode (LED) device coupled to the radar device and configured to illuminate one or more LEDs to indicate the deviation to a user, and further comprising an inclinometer configured to provide a present tilt angle of the radar device to the controller.

3. The radar system of claim 1, wherein the coordinating device comprises a speaker coupled to the radar device and configured to provide audible feedback to indicate the deviation to a user.

4. The radar system of claim 1, wherein the coordinating device comprises a user device comprising a display and speakers and is configured to provide visual feedback via the display and/or audio feedback via the speakers based on the deviation.

5. The radar system of claim 1, wherein:

the installation parameters comprise a desired tilt angle for the radar device;

the present orientation comprises a present tilt angle of the radar device in an in-progress installation of the radar device; and the deviation comprises a difference between the desired tilt angle and the present tilt angle.

6. The radar system of claim 1, wherein:

the installation parameters comprise a desired heading angle for the radar device;

the present orientation comprises a present heading angle of the radar device in an in-progress installation of the radar device; and the deviation comprises a difference between the desired heading angle and the present heading angle.

7. The radar system of claim 1, wherein:

the communication device comprises a wireless local area network communication-enabled device;

the coordinating device comprises a wireless local area network communication-enabled mobile device associated with a user; and sending of the deviation is performed via wireless local area network communication through the communication device.

8. The radar system of claim 1, wherein:

the communication device comprises a personal area network communication-enabled device;

the coordinating device comprises a personal area network communication-enabled mobile device associated with a user; and sending of the deviation is performed via personal area network communication through the communication device.

9. The radar system of claim 1, wherein:

the installation parameters comprise a desired mounting height for the radar device;

the present orientation comprises a present mounting height of the radar device in an in-progress installation of the radar device; and the deviation comprises a difference between the desired mounting height and the present mounting height; and wherein the radar system further comprises an altimeter configured to provide the present mounting height of the radar device to the controller, and a GPS device configured to provide a present GPS coordinate position of the radar device to the controller.

10. The radar system of claim 1, wherein:

the installation parameters comprise a desired global positioning system (GPS) coordinate position for the radar device;

the present orientation comprises a present GPS coordinate position of the radar device in an in-progress installation of the radar device; and the deviation comprises a difference between the desired GPS coordinate position and the present GPS coordinate position.

11. A radar system comprising:

a transceiver configured to transmit and receive radio waves;

a device configured to provide calibration data; and a controller communicatively coupled to the transceiver and the device, wherein the controller is configured to:

receive user input from a user device at each of a plurality of locations to provide a user-generated calibration movement pattern;

determine, based on radio waves received by the transceiver from a detection area, a first tracked movement parameter of a target at the plurality of locations as the target moves along the user-generated calibration movement pattern within the detection area;

determine, based on the calibration data obtained from the device, a second tracked movement parameter of the target at the plurality of locations as the target moves along the user-generated calibration movement pattern within the detection area;

correlate the first tracked movement parameter to the second tracked movement parameter; and calibrate the radar system based on the correlation of the first tracked movement parameter to the second tracked movement parameter.

12. The radar system of claim 11, wherein:

the first tracked movement parameter of the target comprises a velocity of the target corresponding to the plurality of locations as the target moves along the user-generated calibration movement pattern; and the second tracked movement parameter of the target comprises global positioning (GPS) locations of the target corresponding to the plurality of locations as the target moves along the user-generated calibration movement pattern; and wherein:

the controller is further configured to obtain the GPS locations of the target from the device during a same time period in which the controller performs the determining of the first tracked movement parameter; and or the radar system is further calibrated based on a GPS location of the target relative to the GPS locations of the target corresponding to the plurality of locations as the target moves along the user-generated calibration movement pattern.

13. The radar system of claim 11, wherein:

the first tracked movement parameter of the target comprises a velocity of the target corresponding to the plurality of locations as the target moves along the user-generated calibration movement pattern;

the device comprises an imager device configured to capture image frames of at least the detection area;

the controller is configured to determine, based on the image frames captured by the imager device, location data of the target corresponding to the plurality of locations as the target moves along the user-generated calibration movement pattern within the detection area; and the calibration data comprises the location data; and wherein:

the imager device comprises a thermal imager; and the correlating the first tracked movement parameter to the second tracked movement parameter is based at least in part on a known delay in the first tracked movement parameter and the second tracked movement parameter.

14. The radar system of claim 11, wherein:

the controller is further configured to send, via the transceiver, the radio waves toward the detection area; and the radio waves received by the transceiver from the detection area are reflected radio waves from the target at the plurality of locations as the target moves along the user-generated calibration movement pattern within the detection area.

15. The radar system of claim 11, wherein the controller is further configured to:

determine, based on radio waves received by the transceiver from the detection area, a plurality of tracked targets detected within the detection area, wherein the target is one of the plurality of tracked targets; and receive a user selection of the target amongst the plurality of tracked targets.

16. The radar system of claim 11, wherein the target comprises a radar reflector.

17. The radar system of claim 11, wherein:

the target comprises a radar emitter that emits the radio waves received by the transceiver; and the controller is further configured to provide a notification that the radio waves have been received at each of the plurality of locations as the target moves along the user-generated calibration movement pattern within the detection area.

18. The radar system of claim 17, further comprising a light-emitting diode (LED) device configured to, in response to a control signal from the controller, illuminate to provide the notification, and wherein the notification is provided for display on the user device associated with the target as the target moves along the user-generated calibration movement pattern.

19. A method for installing the radar system of claim 1, the method comprising:

sending, to the radar system, the installation parameters associated with the installation of the radar system; and adjusting the radar device based on the feedback for facilitating the installation of the radar device.

20. A method for calibrating the radar system of claim 14, the method comprising:

moving along the user-generated calibration movement pattern;

reflecting or emitting a radio signal at each of the plurality of locations along the user-generated calibration movement pattern; and calibrating the radar system.

* * * * *